US012263891B2

(12) United States Patent
Chacaton

(10) Patent No.: US 12,263,891 B2
(45) Date of Patent: Apr. 1, 2025

(54) VEHICLE COMPRISING AIR DEFLECTING ASSEMBLY

(71) Applicant: Volvo Truck Corporation, Gothenburg (SE)

(72) Inventor: Damien Chacaton, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 276 days.

(21) Appl. No.: 17/950,263

(22) Filed: Sep. 22, 2022

(65) Prior Publication Data

US 2023/0094457 A1   Mar. 30, 2023

(30) Foreign Application Priority Data

Sep. 29, 2021  (EP) ..................................... 21199910

(51) Int. Cl.
B62D 35/00 (2006.01)

(52) U.S. Cl.
CPC .............. B62D 35/001 (2013.01); *Y02T 10/82* (2013.01)

(58) Field of Classification Search
CPC ............................... B62D 35/001; Y02T 10/82
See application file for complete search history.

(56) References Cited

U.S. PATENT DOCUMENTS

| 4,375,898 A * | 3/1983 | Stephens | B62D 35/001 |
| | | | 296/180.3 |
| 2005/0173945 A1 | 8/2005 | Frank et al. | |
| 2008/0244921 A1 * | 10/2008 | Silberman | G01B 5/0025 |
| | | | 33/832 |
| 2013/0173121 A1 | 7/2013 | Tenstam | |
| 2021/0101648 A1 * | 4/2021 | Kristiansson | B62D 35/00 |

FOREIGN PATENT DOCUMENTS

| DE | 3619959 A1 | 12/1987 |
| DE | 102008056357 A1 | 5/2010 |
| DE | 102012023577 A1 | 6/2014 |
| DE | 102017012002 A1 | 6/2018 |

(Continued)

OTHER PUBLICATIONS

James Whidborne; Drag Reduction for Trucks by Deflector Extremum Seeking Control; Mar. 2018; Conference: Workshop on Active Drag REduction Aachen, Germany. (Year: 2018).*

(Continued)

*Primary Examiner* — Daniel J Colilla
(74) *Attorney, Agent, or Firm* — Withrow & Terranova, PLLC

(57) ABSTRACT

The invention relates to a vehicle characterized in that it comprises a tractor having a chassis extending along a longitudinal axis supported by wheels, a cab mounted on a chassis, an air deflecting assembly installed on a roof of the cab, the air deflecting assembly having a shield and an adjustment mechanism configured adjust a rear height of the shield, a semi-trailer configured to be removably attached to the tractor, a mechanical measuring device comprising a first portion configured to be disposed on a semi-trailer roof, second and third portions adjacent to the semi-trailer front wall, the third portion configured to indicate an optimal position of the air deflecting assembly selected from among predetermined positions.

13 Claims, 2 Drawing Sheets

(56) References Cited

FOREIGN PATENT DOCUMENTS

| EP | 0076944 | A1 |   | 4/1983  |            |
|----|---------|----|---|---------|------------|
| EP | 1055589 | A2 | * | 11/2000 | B62D 35/001 |
| GB | 2139165 | A  | * | 11/1984 | B62D 35/001 |
| GB | 2579168 | A  | * | 6/2020  | B62D 35/001 |
| JP | 2007196783 | A |   | 8/2007  |            |

OTHER PUBLICATIONS

The Road Haulage Association; Heigh Pole MEasuring Device; Youtube video; https://www.youtube.com/watch?v=6BLB7y6cEks; accessed on 8/292/2024; published Jun. 5, 2017. (Year: 2017).*
European Search Report for European Patent Application No. 21199910.7, completed Mar. 4, 2022, 12 pages.

* cited by examiner

VEHICLE COMPRISING AIR DEFLECTING ASSEMBLY

RELATED APPLICATIONS

The present application claims priority to European Patent Application No. 21199910.7, filed on Sep. 29, 2021, and entitled "VEHICLE COMPRISING AIR DEFLECTING ASSEMBLY," which is incorporated herein by reference in its entirety.

TECHNICAL FIELD

The invention relates to a vehicle comprising an air deflecting assembly and a method for decreasing air flow resistance of vehicle.

The invention can be applied in low-duty, medium-duty and heavy-duty vehicles, such as tractor units.

BACKGROUND

Commercial vehicles such as trucks are often configured as semitrailer pulling tractors. The tractor vehicle is provided with a so called "fifth wheel" for coupling to trailers. Often tractor vehicle are utilized for moving different trailers between logistic centres.

Tractor vehicles are normally provided with air deflecting assemblies. Air deflecting assemblies guide the airflow at the rear end of the cabin truck and bridge the gap between the rear end of the truck cab and the front end of the trailer.

However improperly adjusted air deflecting assembly will have a negative impact on fuel efficiency and air pollution. This can happen when a tractor truck switches between trailers of different height or the trailer is uncoupled from the truck so that it is driven without a trailer.

As the height of trailers can vary, air deflecting assemblies are normally adjustable in angle between a low position suitable for driving without a trailer and a top position adapted to the trailer height. In other words, air deflecting assemblies can be adjusted in the rear height, to accommodate different heights of the semi-trailer.

It is known to use automatic adjustment of the air deflecting assemblies.

UK patent application GB2579168 discloses auto-height adjustable air deflector for vehicles with automatically adjustable, sensor configured to detect a position of a top leading edge of a body of the vehicle or of a trailer. However, these systems are expensive involving adjustment mechanisms that need to be robust enough to accommodate for forces induced by both side and head wind.

Furthermore, the weight of this mechanism at the top of a tractor roof has a negative influence on both road handling and driver comfort.

SUMMARY

An object of the invention is to overcome or substantially improve one or more of the deficiencies of the prior art by providing a vehicle comprising a tractor having an air deflecting assembly that is easily adjustable using a non-expensive, a robust and a light way.

A first object is achieved by a vehicle characterized in that it comprises:
A tractor having:
  A chassis extending along a longitudinal axis supported by wheels;
  A cab mounted on a chassis;
  An air deflecting assembly installed on a roof of the cab, said air deflecting assembly having a shield and an adjustment mechanism configured adjust a rear height of the shield;
A semi-trailer configured to be removably attached to the said tractor;
A mechanical measuring device comprising a first portion configured to be disposed on a semi-trailer roof, a second and a third portions adjacent to the semi-trailer front wall, said third portion configured to indicate an optimal position of the air deflecting assembly selected from among predetermined positions.

By the provision of a vehicle according to the present invention, the advantage is to provide a robust and non-expensive way to adjust the air deflecting assembly. Furthermore, the mechanical measuring device is a light mechanism easily comprehensible by user to indicate the optimal position of the air deflecting assembly. Thus, the user can use this reliable mechanical measuring device every time the semi-trailer is changed to adjust more precisely the rear height of the shield leading to a significant decrease of the air flow resistance and therefore to the fuel consumption.

According to an embodiment, the first portion of the mechanical measuring device is rigid. In this embodiment, the first portion is easily fit on the semi-trailer roof.

According to one embodiment, the first portion of the mechanical measuring device comprises reusable fixation means. In this embodiment, the fixation means increase the fixation of the first portion on the semi-trailer roof and are easily removed before being reused on a new semi-trailer.

According to one embodiment, the second and the third portions of the mechanical measuring device comprise a scale of measure. In this embodiment, the second and the third portions of the mechanical measuring device are used to measure the front wall of the semi-trailer.

According to one embodiment, the third portion of the mechanical measuring device comprises a plurality of segments corresponding each to predetermined position of the air deflecting assembly. In this embodiment, the segments are used to determine the optimal position of the air deflecting assembly selected from the predetermined positions of the air deflecting assembly.

According to one embodiment, each segment comprises a distinctive sign, each distinctive sign corresponding to a range of a front wall height of the semi-trailer. In this embodiment, the user recognizes the optimal position of the air deflecting assembly using the distinctive sign.

According to one embodiment, the mechanical measuring device is foldable, telescopic or rolled. In this embodiment, the mechanical measuring device can be stored in the cab of the tractor.

According to one embodiment, the adjustment mechanism of the air deflecting assembly is connected to the shield, said adjustment mechanism comprising:
  Two brackets located on a rear wall of the cab, both brackets comprising notches corresponding to a predetermined position of the air deflecting assembly,
  a frame including two lateral arms and, one transversal arm including fingers configured to engage into bracket notches,
  a lever system connecting the shield with the frame and adjusting the shield rear height according to the position of fingers in the notches.

According to one embodiment, the fingers of the transversal arm are locked into the notches of the brackets using locking means.

According to one embodiment, each notch comprises a distinctive sign, each distinctive sign corresponding to a range of the sum of the shield rear height and the rear wall height of the cab air deflecting assembly. In this embodiment, the same distinctive signs are present in the bracket notches and in the segments of the mechanical measuring device.

According to one embodiment, the distinctive sign is a letter, a number, a pattern and/or a colour.

A second object is achieved by a method for decreasing air flow resistance of vehicle according to the present invention characterized in that it comprises:

A. Application of the mechanical measuring device on the semi-trailer so that its first portion is disposed on the semi-trailer roof, its second and third portions are adjacent to the semi-trailer front wall, B. Determination of an optimal position of the air deflecting assembly selected from among predetermined positions, C. Adjustment of the air deflecting assembly based on said optimal position.

The method according to the present invention is easy-to-apply for the user and can be apply on a wide range of vehicles, in particular on a wide range of semi-trailers, to precisely adjust the air deflecting assembly depending on the measure of the mechanical measuring device. Furthermore, thanks to the mechanical measuring device and the air deflecting assembly, the determination of the optimal position of the air deflecting assembly is quick and reliable.

According to one embodiment, in step B), the optimal position of the air deflecting assembly is visually determined among predetermined positions of the air deflecting assembly by looking the intersection of the third portion of the mechanical measuring device extending along the semi-trailer front wall and a top surface of the chassis. In this embodiment, the determination of the optimal position of the air deflecting assembly is performed quickly by the user.

According to one embodiment, in step B), the distinctive sign of the segment of the third portion of the mechanical measuring device intersecting with the top surface of the chassis defines the optimal position of the air deflecting assembly. In this embodiment, the distinctive sign is an efficient way to quickly determine the optimal position of the air deflecting assembly.

According to one embodiment, in step B), the optimal position of the air deflecting assembly is reached when the sum of height of the rear wall of the cab and the rear height of the shield is substantially equal to the height of the front wall of the semi-trailer.

According to one embodiment, in step C), the rear height of the shield is adjusted to reach the optimal position. In this embodiment, the optimal position of the air deflecting assembly defined by the distinctive sign of the segment of the third portion of the mechanical measuring device intersecting with the top surface of the chassis is used to adjust the rear height of the shield. In other words, the fingers of the transversal arm of the frame will be engaged into bracket notches having the same distinctive sign so that the lever system will adjust the shield rear height according to the position of fingers in the notches.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

The present description is given in an X, Y, Z referential where X is defined as the longitudinal direction of the vehicle 1, Y is defined as the transversal direction and Z is defined as the vertical direction of the vehicle 1.

Figure 1:
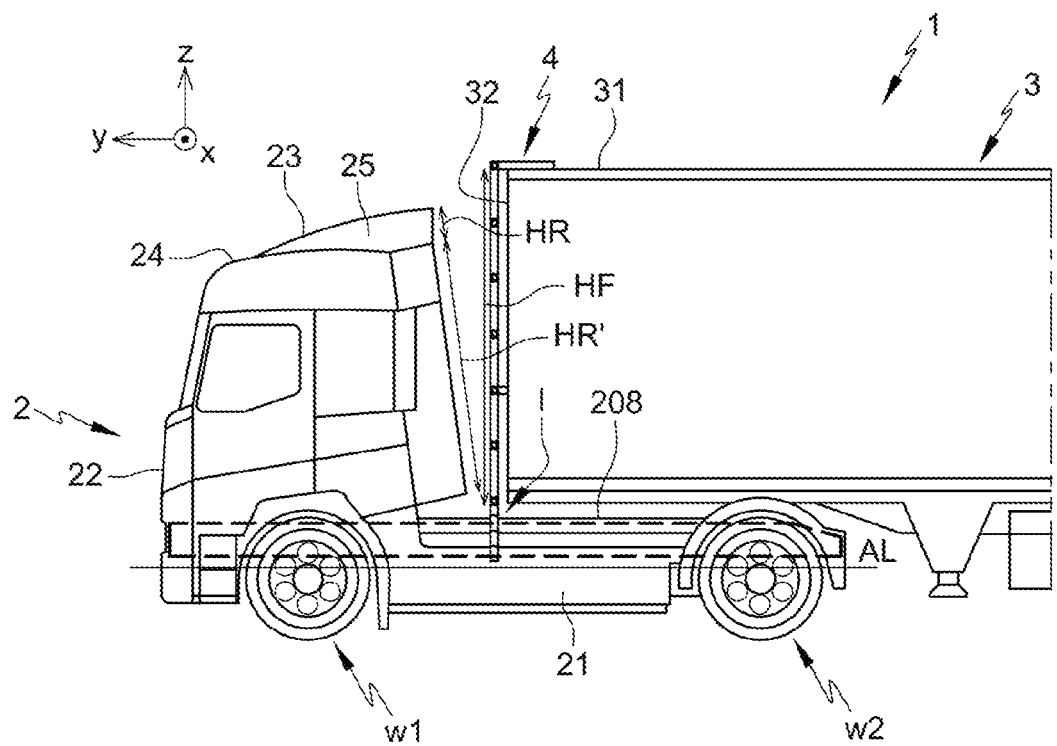
FIG. 1 is a side view of a vehicle according to one embodiment.

FIG. 1 shows a vehicle 1 comprising a tractor 2 and a semi-trailer 3 configured to be removably attached the said tractor 2. The tractor 2 has a chassis 21 extending along a longitudinal axis $A_L$. For example, the chassis 21 is supported by front wheels W1 and rear wheels W2. The tractor 2 further comprises a cab 22 suitably mounted on the chassis 21.

An air deflecting assembly 23 installed on the cab roof 24, said air deflecting assembly 23 having a shield 25 and an adjustment mechanism 26 configured adjust a rear height HR of the shield 25 (FIG. 1).

The vehicle 1 comprises a mechanical measuring device 4 comprising a first portion P1 configured to be disposed on a semi-trailer roof 31, a second P2 and a third P3 portions adjacent to the semi-trailer front wall 32, said third portion P3 configured to indicate an optimal position of the air deflecting assembly 23 selected from among predetermined positions.

The first portion P1 of the mechanical measuring device 4 may be rigidly fit on the semi-trailer roof 31. For example, the first portion P1 of the mechanical measuring device 4 comprises reusable fixation means (not shown) to increase the fixation of the first portion P1 on the semi-trailer roof 31 and to be easily removed before being reused.

The second P2 and a third P3 portions of the mechanical measuring device 4 may comprise a scale of measure (not shown). For example, the scale of measure is in millimetre.

The third portion P3 of the mechanical measuring device 4 may comprise a plurality of segments S1, S2, S3, S4, S5 corresponding each to a predetermined position of the air deflecting assembly 23.

Each segment S1, S2, S3, S4, S5 comprises a distinctive sign, each distinctive sign corresponding to a range of a front wall height HF of the semi-trailer 3. In the illustrated example, the distinctive sign are the following letters: A, B, C, D, E.

Figure 2:
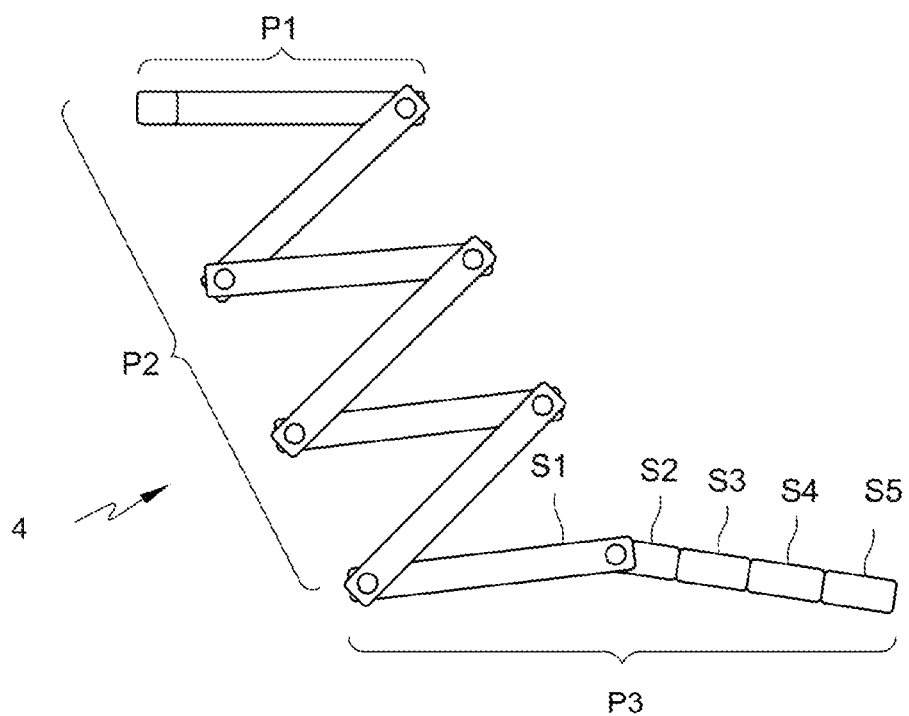
FIG. 2 is a mechanical measuring device according to one embodiment.

The mechanical measuring device 4 may be foldable (FIG. 2) to be stored in the cab 22 of the tractor 2.

Figure 3:
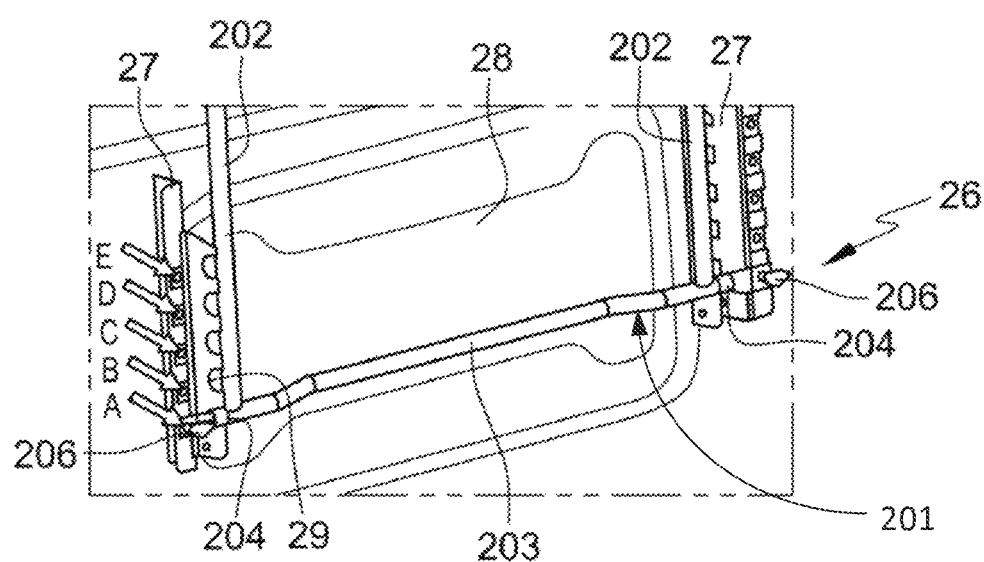
FIG. 3 is the rear wall of the cab according to one embodiment.

As shown in FIG. 3, the adjustment mechanism 26 of the air deflecting assembly 23 may be connected to the shield 25. The adjustment mechanism 26 may comprise:

Two brackets 27 located on a rear wall 28 of the cab 22, both brackets 27 comprising notches 29, each corresponding to a predetermined position of the air deflecting assembly 23, a frame 201 including two lateral arms 202 and, one transversal arm 203 including fingers 204 configured to engage into the bracket notches 29, a lever system connecting the shield 25 with the frame 201 and adjusting the shield rear height HR according to the position of fingers 204 in the notches 29.

The fingers 204 of the transversal arm 203 are locked into the notches 29 of the brackets 27 using locking means 206. The locking means 206 may include screw-nut system.

Each notch 29 comprises a distinctive sign, each distinctive sign A, B, C, D, E corresponding to a range of the sum of the shield rear height HR and the rear wall height HR' of the cab 22 air deflecting assembly 23. Preferably, the same distinctive signs A, B, C, D, E are present in the bracket notches 29 and in the segments S1, S2, S3, S4, S5 of the mechanical measuring device 4.

For example, the distinctive sign A corresponds to a height below 3000 mm. The distinctive sign B corresponds to a height above or equal to 3000 mm. The distinctive sign C corresponds to a height above or equal to 3060 mm. The distinctive sign D corresponds to a height above or equal to 3135 mm. The distinctive sign E corresponds to a height above or equal to 3210 mm.

In another example, the distinctive sign A corresponds to a height below 3020 mm. The distinctive sign B corresponds to a height above or equal to 3020 mm. The distinctive sign C corresponds to a height above or equal to 3080 mm. The distinctive sign D corresponds to a height above or equal to 3155 mm. The distinctive sign E corresponds to a height above or equal to 3230 mm.

Thus, for decreasing air flow resistance of the vehicle 1, in a step A), the user applies the mechanical measuring device 4 on the semi-trailer 3 so that its first portion P1 is positioned on the semi-trailer roof 31, its second P2 and third P3 portions are adjacent to the semi-trailer front wall 32.

In a step B), the user determines the optimal position of the air deflecting assembly 23 selected from among predetermined positions. To do so, the driver may look at the intersection I of the third portion P3 of the mechanical measuring device 4 extending along the semi-trailer front wall 32 and a top surface 208 of the chassis 21. Thus, the driver may visually determine the distinctive sign A, B, C, D, E of the segment S1, S2, S3, S4, S5 of the third portion P3 of the mechanical measuring device 4 that intersects with the top surface 208 of the chassis 21 to obtain the optimal position of the air deflecting assembly 23.

In step B), the optimal position of the air deflecting assembly may be reached when the sum of height of the rear wall HR' of the cab 22 and the rear height HR of the shield 25 substantially equals the height of the front wall HF of the semi-trailer. The optimal position may also depend on the roof deflector design (shape+position of rotation axis).

In a step C), the user adjusts the air deflecting assembly 23 based on said optimal position. In particular, the rear height HR of the air deflecting assembly is adjusted to reach the optimal position. To this end, the fingers 204 of the transversal arm 203 of the frame 201 is engaged into bracket notches 29 having the same distinctive sign than in step B) so that the lever system adjusts the shield rear height HR according to the position of fingers 204 in the notches 29.

By the provision of a vehicle and a method according to the present invention, the air deflecting assembly is more precisely adjusted using a robust, lighter and non-expansive mechanical measuring device. Furthermore, the reliable mechanical measuring device may be used in a wide range of vehicle, in particular semi-trailers, to adjust the air deflecting assembly leading to a significant decrease of the air flow resistance and therefore to the fuel consumption.

It is to be understood that the present invention is not limited to the embodiments described above and illustrated in the drawings; rather, the skilled person will recognize that many changes and modifications may be made within the scope of the appended claims.

The invention claimed is:

1. A vehicle comprising:
   a tractor comprising:
      a chassis extending along a longitudinal axis supported by wheels;
      a cab mounted on the chassis; and
      an air deflecting assembly installed on a roof of the cab, the air deflecting assembly having a shield and an adjustment mechanism configured adjust a rear height of the shield;
   a semi-trailer configured to be removably attached to the tractor, the semi-trailer comprising a semi-trailer roof and a semi-trailer front wall; and
   a mechanical measuring device comprising a first portion configured to be disposed on the semi-trailer roof, a second portion and a third portion adjacent to the semi-trailer front wall, the third portion configured to indicate an optimal position of the air deflecting assembly selected from among predetermined positions, the mechanical measuring device being configured so that the optimal position of the air deflecting assembly is visually determined among the predetermined positions of the air deflecting assembly by looking at the intersection of the third portion of the mechanical measuring device extending along the semi-trailer front wall and a top surface of the chassis;
   wherein the adjustment mechanism of the air deflecting assembly is connected to the shield and the adjustment mechanism comprises:
      two brackets located on a rear wall of the cab, each bracket comprising a plurality of notches each corresponding to one predetermined position of the air deflecting assembly, and
      a frame including two lateral arms and one transversal arm, the transversal arm including a pair of fingers configured to engage with the notches of the brackets,
      wherein movement of the pair of fingers of the transversal arm, from a first notch of the plurality of notches into another notch of the plurality of notches corresponding to another predetermined position of the air deflecting assembly, adjusts the rear height of the shield.

2. The vehicle of claim 1, wherein the first portion of the mechanical measuring device is rigid.

3. The vehicle of claim 1, wherein the second portion and the third portion of the mechanical measuring device each comprise a scale of measure.

4. The vehicle of claim 1, wherein the third portion of the mechanical measuring device comprises a plurality of segments each corresponding to the predetermined positions of the air deflecting assembly.

5. The vehicle of claim 4, wherein each segment of the plurality of segments comprises a distinctive sign, each distinctive sign corresponding to a range of a front wall height of the semi-trailer.

6. The vehicle of claim 1, wherein the mechanical measuring device is foldable, telescopic, or rolled.

7. The vehicle of claim 1, wherein the fingers of the transversal arm are locked into the notches of the brackets using locking means.

8. The vehicle of claim 1, wherein each notch comprises a distinctive sign, each distinctive sign corresponding to a range of possible values of the sum of the rear height of the shield and a height of the rear wall of the cab air deflecting assembly.

9. The vehicle of claim 8, wherein the distinctive sign is a letter, a number, a pattern, and/or a colour.

10. A method for decreasing air flow resistance of the vehicle of claim 1, the method comprising the steps of:
applying the mechanical measuring device on the semi-trailer so that the first portion is disposed on the semi-trailer roof, and the second portion and the third portions are adjacent to the semi-trailer front wall,
determining an optimal position of the air deflecting assembly selected from among the predetermined positions, the optimal position of the air deflecting assembly being visually determined among predetermined positions of the air deflecting assembly by looking at the intersection of the third portion of the mechanical measuring device, extending along the semi-trailer front wall, and a top surface of the chassis, and
adjusting the air deflecting assembly based on the optimal position.

11. The method of claim 10, wherein the step of determining further comprises a distinctive sign of the third portion of the mechanical measuring device intersecting the top surface of the chassis and defining the optimal position of the air deflecting assembly.

12. The method of claim 10, wherein the step of determining further comprises the optimal position of the air deflecting assembly being reached when the sum of a height of a rear wall of the cab and the rear height of the shield is substantially equal to a height of the front wall of the semi-trailer.

13. The method of claim 10, wherein the step of adjusting further comprises the rear height of the shield being adjusted to reach the optimal position.

* * * * *